US005620023A

United States Patent [19]
Moon

[11] Patent Number: 5,620,023
[45] Date of Patent: Apr. 15, 1997

[54] EXHAUST-CONTROL VALVE FOR AN ELECTROMAGNETIC PUMP

[75] Inventor: Sung-Dai Moon, Kyeongsangbuk-do, Rep. of Korea

[73] Assignee: Daewoo Electronics Co., Ltd., Seoul, Rep. of Korea

[21] Appl. No.: 440,978

[22] Filed: May 15, 1995

[30] Foreign Application Priority Data

Jul. 23, 1994 [KR] Rep. of Korea ............... 94-17866

[51] Int. Cl.$^6$ .................................................. G05D 16/10
[52] U.S. Cl. ............... 137/509; 137/505.13; 137/614.21
[58] Field of Search ............... 137/509, 505.13, 137/614.21

[56] References Cited

U.S. PATENT DOCUMENTS

| | | | |
|---|---|---|---|
| 2,596,368 | 5/1952 | Brunton | 137/509 |
| 3,876,153 | 4/1975 | Roosa | 137/509 |
| 4,620,562 | 11/1986 | Pacht | 137/509 X |
| 5,042,697 | 8/1991 | Warren | 137/505.13 X |

*Primary Examiner*—Stephen M. Hepperle
*Attorney, Agent, or Firm*—Fish & Richardson, P.C.

[57] ABSTRACT

An exhaust control valve for an electromagnetic pump is disclosed. By the exhaust control valve, pressure and quantity of exhausted oil is maintained constant, noise is reduced, an incomplete combustion of oil is prevented and energy efficiency is improved. The exhaust control valve has a tapered cylindrical valve body, a frustoconical head formed at one end of the body, a nipple integrally formed with the frustoconical head and a spring for applying forward biasing force to the body. The exhaust control valve moves forwards and backwards according to the variation of pressure applied thereof so that oil having constant pressure is exhausted to a burner.

12 Claims, 7 Drawing Sheets

EXHAUST-CONTROL VALVE FOR AN ELECTROMAGNETIC PUMP

BACKGROUND OF THE INVENTION

1. Field of the Invention

The present invention relates to an exhaust control valve, and more particularly to an exhaust control valve for an electromagnetic pump, by which the pressure and quantity of exhausted oil can be maintained at constant levels, an incomplete combustion of the exhausted oil can be prevented and a loud noise, which is caused by exhaust of a high pressurized oil, can be prevented.

2. Related Art

An electromagnetic pump is an appliance for supplying fluid, and is generally used for supplying oil to a burner in a boiler system.

A conventional electromagnetic pump is operated as follows. Firstly, when an electric power is applied to a solenoid, a plunger assembly is moved upward so that oil is introduced into the electromagnetic pump from an oil tank. Then, when the electric power applied to the solenoid is cut-off, the plunger assembly is moved downward so that the sucked oil is pressurized. As the up and down movement of the plunger assembly is repeated, the pressurized oil is exhausted to a burner through an exhaust nozzle disposed in an upper portion of the electromagnetic pump. Meanwhile, when the pressure of the pressurized oil exceeds a predetermined value, some of the pressurized oil is returned to an oil inlet portion by a relief valve in order to control the pressure of the pressurized oil and is recirculated in the electromagnetic pump.

However, the conventional electromagnetic pump has the following disadvantages. Firstly, as shown as the letter "A" in FIG. 8, a highly pressurized oil having a pressure over a normal exhaust pressure P3 may be exhausted to the burner when the burner is ignited and thereby a loud noise is generated. In the present application, P1, P3, T1, T2, and T3 respectively mean an initial pressure, a normal exhaust pressure, a time when pressure of oil starts to increase, a time when a burner is ignited and a time when an oil having the normal exhaust pressure is exhausted.

Further, the biasing force of a spring to block an exhaust path of oil is so weakly set that the oil exhaust path is blocked-off belatedly after the operation of the pump has been finished. Accordingly, oil of low pressure may be leaked to the burner even after the operation of the pump has been finished. The leaked oil having low pressure is not completely burned by the burner and so it produces a bad smell.

To overcome the above described problems, another conventional electromagnetic pump is suggested, in which the pressure of a sucked oil is firstly controlled between a pressure control plunger and a guide rod, and is secondarily controlled by means of a relief valve, thereby loud noise which is generated due to exhaust of a high pressurized oil in a burner when the burner is ignited, can be decreased.

The construction of the conventional electromagnetic pump as described above is shown in FIG. 6.

As shown in FIG. 6, an electromagnetic pump 500 has a pump body 510. Pump body 510 comprises an inlet portion 512 for receiving oil from an oil tank, a first chamber 516 interconnected with inlet portion 512 through a first oil path 514, a second chamber 520 interconnected with both inlet portion 512 and first chamber 516 through a filter 540 and a second oil path 522 respectively, a third chamber 527 interconnected with both second chamber 520 and inlet portion 512 through a third path 524 and a fourth path 529 respectively, and a working chamber 526 in which a plunger assembly (not shown) is reciprocated.

A pressure control plunger 570 and a guide rod 580 are disposed in first chamber 516 interconnected with inlet portion 512 and a cover 600 is inserted in an open end of first chamber 516. A first spring 610 is disposed between pressure control plunger 570 and cover 600.

In addition, a suction check valve 550 and an exhaust check valve 560 are arranged in second chamber 520 in such a manner that they permit the oil to flow in the same direction. Working chamber 526 is interconnected with a fifth oil path 555 formed between suction check valve 550 and exhaust check valve 560 so that suction check valve 550 and exhaust check valve 560 are alternately opened and closed as the plunger assembly is reciprocated in working chamber 526.

A relief valve 630 is disposed in third chamber 527 of pump body 510, and is supported by a second spring 640 having a predetermined initial biasing force such that third oil path 524 is blocked off from fourth oil path 529 when relief valve is maintained in its initial position.

The operation of the conventional electromagnetic pump having a construction as described above is as follows.

When electric power is applied to the solenoid (not shown), a magnetic core (not shown) is magnetized so that the plunger assembly moves upwards. At this time, the volume of working chamber 526 is expanded so that the pressure in fifth oil path 555 connected thereto decreases. Thus, suction check valve 550 is opened and exhaust check valve 560 is closed, while oil is supplied to inlet portion 512 of pump body 510 from an oil tank through suction path 532 of connecting pipe 530. Some of the supplied oil fills up both first chamber 516 and third chamber 527 through first and fourth oil paths 514 and 529 respectively, and the remaining oil passes through suction check valve 550 disposed in second chamber 520 via filter 540.

Meanwhile, when the electric power applied to the solenoid is cut-off, the magnetic force applied to magnetic core is released so that the plunger assembly moves downwards. At this time, the volume of working chamber 526 is compressed so that the pressure in fifth oil path 555 interconnected thereto increases. Accordingly, suction check valve 550 is closed and exhaust check valve 560 is opened, while the oil pressurized in working chamber 526 is passing through exhaust check valve 560. At the same time, as shown in FIG. 7, the oil pressure starts increasing from initial pressure P1. Some of the pressurized oil having passed through exhaust check valve 560 flows through second oil path 522 into a space 518 formed between a side wall of first chamber 516 and an inner wall of pressure control plunger 570, and the rest flows into the front of relief valve 630 through third oil path 524.

As the up and down movement of the plunger assembly is repeated, the pressure of oil having flowed into space 518 through second oil path 522 continues to increase more and more so that pressure control plunger 570 is pushed backward while compressing a first spring 610. At the same time, as shown in FIG. 7, the pressure of oil also continues to increase from an initial pressure P1 to a second pressure P2. The oil having second pressure P2 can be normally evaporated and easily burned by the burner. In this way, the pressure of oil can be firstly controlled by pressure control plunger 570, and an oil having a controlled pressure can be exhausted to the burner when the burner is ignited and thereby the loud noise can not be generated.

When pressure control plunger 570 is moved up to a position where a protuberance 576 of pressure control plunger 570 contacts a projection 590 of cover 600, pressure control plunger 570 does not control the pressure of oil in the pump 500 any more. From this point, as shown in FIG. 7, the pressure of oil continues to increase from second pressure P2 to normal exhaust pressure P3.

When the pressure of oil having been increased by the repetition of the up and down movement of the plunger assembly exceeds the normal exhaust pressure P3, relief valve 630 is pushed backward while compressing second spring 640. At the same time, third oil path 524 and fourth oil path 529 are interconnected to each other so that some of pressurized oil over normal exhaust pressure P3 is returned to inlet portion 512 through fourth oil path 529 so as to decrease the pressure of the pressurized oil. Meanwhile, when the pressure of the pressurized oil in pump 500 decreases below normal exhaust pressure P3, relief valve 630 moves forward again so that fourth oil path 529 and third oil path 524 are blocked off again from each other. In this way, when the pressure of oil in pump 500 increases above the normal exhaust pressure P3, relief valve 630 moves backwards so as to interconnect third and fourth oil paths 524 and 529 with each other, and when the pressure of the pressurized oil in the pump 500 decreases below normal exhaust pressure P3, relief valve 630 moves forwards again to block off fourth oil path 529 and third oil path 524 from each other. As the above process is repeated continuously, the pressure of pressurized oil in the pump 500 is maintained almost constant and the pressurized oil having normal exhaust pressure P3 is exhausted to the burner.

In short, in conventional electromagnetic pump 500 as described above, the pressure of pressurized oil can be controlled in two steps by means of pressure control plunger 570 and relief valve 630 so that the loud noise, which is generated due to exhaust of the high pressurized oil to the burner when the burner is ignited, can be prevented.

However, the conventional electromagnetic pump 500 constructed as described above has the following disadvantages.

First, it necessarily requires pressure control plunger 570 for controlling the pressure of oil, first chamber 516 for accommodating pressure control plunger 570, separate relief valve 630 for secondly controlling the pressure of the pressurized oil and a separate element such as a buffer 620 for reducing pulsation of the pumped oil so that the volume of pump body 510 of the electromagnetic pump 500 is large, the weight of electromagnetic pump 500 is heavy, and its manufacturing cost increases.

Further, when the pressure of oil having been increased exceeds normal exhaust pressure P3, some of the pressurized oil is returned to inlet portion 512 of pump body 510 and is re-circulated in pump 500 in order to control the pressure of the pressurized oil. Therefore, there is waste of energy in re-circulating redundant oil.

Furthermore, it can not overcome the problem of the conventional electromagnetic pump as described hereinbefore. That is, it also uses a spring to block an oil exhaust path, and a biasing force of the spring is so weakly predetermined that the oil exhaust path is blocked-off belatedly after the operation of the pump 500 has finished. Accordingly, the oil of low pressure may be leaked to the burner even after the operation of the pump has been finished. The leaked oil having a low pressure is incompletely burned in the burner and thereby generates a bad smell.

On the other hand, a U.S. patent application with regard to an electromagnetic pump having a simple construction, in which the quantity of exhausted oil can be controlled in proportion to the pressure applied thereto and the incomplete combustion of oil can be avoided, has been filed by the applicant of the present invention and now is pending as U.S. Ser. No. 08/412,336.

The above electromagnetic pump has an exhaust control valve for overcoming the above problems. The exhaust control valve comprises a conical head, tapered cylindrical body and a guide tail. In the above electromagnetic pump, the exhaust control valve is disposed in an exhaust chamber interconnected to an oil exhaust path, and a rear end of which is supported by a spring having an initial biasing force such that the conical head of the exhaust control valve can close the exhaust path of oil when the exhaust control valve is maintained in its initial position.

In this state, the pressurized oil is flowed into the exhaust chamber according to the reciprocating movement of a plunger assembly, and the pressure in the exhaust chamber increases as the reciprocating movement of the plunger assembly is repeated. Then, when the increased pressure of oil exceeds the initial biasing force of the spring supporting the rear end of the exhaust control valve, the exhaust control valve moves backwards while compressing the spring, and when the pressure decreases below a second biasing force (i.e., biasing force of compressed spring), the exhaust control valve is moved forward again. The second biasing force is equivalent to a normal exhaust pressure P3 of oil and can be indirectly adjusted by adjusting the initial biasing force of the spring with an adjuster. The exhaust control valve repeats the above process in proportion to the pressure thereof so that the pressure of the exhausted oil can be maintained constant.

Meanwhile, when the operation of the electromagnetic pump has finished, the exhaust oil path can be blocked off quickly by the spring having a relatively strong biasing force so that the incomplete combustion of oil, which is caused by the leakage of oil having a low pressure to the burner, can be prevented.

However, the exhaust control valve having construction as described above can not completely overcome the loud noise problem since the oil having normal exhaust pressure P3 is exhausted so early that the high pressurized oil, even though it has a slightly reduced pressure, is still being supplied to the burner when the burner is ignited.

Accordingly, there is a need to provide an electromagnetic pump in which the loud noise problem can be completely solved, the construction can be simplified, energy efficiency can be improved, and incomplete combustion of oil can be prevented.

SUMMARY OF THE INVENTION

The present invention has been made to overcome the above described problems of the prior arts, and accordingly it is an object of the present invention to provide an exhaust control valve for an electromagnetic pump, by which the operation noise can be reduced, the construction of electromagnetic pump can be simplified, energy efficiency can be improved, and incomplete combustion of oil can be prevented.

To achieve the above object, the present invention provides an exhaust control valve for electromagnetic pump comprising:

a cylindrical valve body disposed in an exhaust chamber so as to move forwards and backwards therein, the cylindrical valve body being tapered toward a rear end thereof, the exhaust chamber being defined in the electromagnetic pump for receiving a pressurized oil to exhaust the pressurized oil through a first oil exhaust path, the exhaust chamber having a gap defined between the valve body and an inner wall of the exhaust chamber in order for the pressurized oil to pass therethrough, a frustoconical head formed integrally with one end of the valve body, the frustoconical head being tapered toward a front end thereof and having a taper angle larger than that of the valve body, the frustoconical head sensing pressure of the pressurized oil and transferring the pressure to the valve body, a threshold disposed between the cylindrical valve body and the frustoconical head, the threshold being shaped as an annular hoop and having the largest diameter in the exhaust control valve, a nipple formed integrally with the front end of the frustoconical head and tapered toward a front end thereof, the nipple having a predetermined length and a taper angle smaller than that of the frustoconical head, the nipple opening and closing the first oil exhaust path interconnected to the exhaust chamber, the nipple being inserted in the first oil exhaust path at its initial position so that the sectional area of the first oil exhaust path being increased as the nipple being moved from the initial position, and when the nipple being completely drawn from the first oil exhaust path, the sectional area of the first oil exhaust path being maintained constant, the nipple reducing pressure of the oil passing through the first oil exhaust path as the first oil exhaust path is opened, a spring disposed in a back pressure chamber for applying forward biasing force to the cylindrical valve body, the back pressure chamber being formed in the rear of the exhaust chamber and interconnected to an inlet portion of the electromagnetic pump through a back pressure oil path, the back pressure chamber and the exhaust chamber being isolated from each other, an adjuster for adjusting the biasing force of the spring, a guide tail formed integrally with other end of the cylindrical valve body and closely disposed in a guide hole formed between the exhaust chamber and the back pressure chamber for guiding the forward and backward movement of the exhaust control valve, the guide tail isolating the exhaust chamber from the back pressure chamber, and a flange provided at a rear end of the guide tail, the flange being supported by the spring, wherein the valve body is moved forward and backward according to interaction between the pressure sensed by the frustoconical head and the forward biasing force by the spring, the exhaust chamber has a neck portion surrounding the rear end of the valve body, the neck portion has a smaller diameter with respect to the rest of the exhaust chamber so that the sectional area of the gap formed between the neck portion and the tapered valve body is varied according to the forward and backward movement of the tapered valve body, and thereby pressure of the oil exhausted from the exhaust chamber is controlled.

In an electromagnetic pump having an exhaust control valve according to the present invention, the pump is operated as follows.

When electric power is intermittently applied to a solenoid, a plunger assembly is moved up and down so that a suction check valve and an exhaust check valve are alternately opened and closed while a pressurized oil is supplied to an exhaust chamber through an oil path.

Then, as pressure of the pressurized oil having been supplied to the exhaust chamber increases, a frustoconical head of the exhaust control valve is forced backwards. When the pressure of oil forcing the frustoconical head of the exhaust control valve overcomes initial force of the spring for supporting the exhaust control valve, the exhaust control valve is pushed backwards while compressing the spring.

However, since the nipple of the exhaust control valve has a predetermined length, the oil exhaust path which is blocked by the nipple is not completely opened simultaneously with the movement of the exhaust control valve. On other words, the nipple is gradually moved backwards while forming a thin passage between a tapered portion of the nipple and the oil exhaust path so that only a little quantity of oil should be exhausted to the burner through the thin passage until the nipple has been moved to completely opened position from the oil exhaust path. At this time, pressure of the exhausted oil is maintained below normal exhaust pressure P3, and thereby when the burner is ignited, the exhausted oil can be easily burned by the burner without making the loud noise.

Meanwhile, as pressure of oil in the exhaust chamber continues to increase by the repetition of the up and down movement of the plunger assembly, the nipple should be farther moved backward. With the backward movement of the nipple, the sectional area of the gap formed between the neck portion and the tapered valve body becomes narrower. Accordingly, the pressure of oil passing through the gap continues to decrease and thereby the pressure applied to the frustoconical head also continues to decrease. In this process, when the pressure applied to the frustoconical head drops below second biasing force of the spring, the exhaust control valve is moved forward again. With the forward movement of the exhaust control valve, the sectional area of the gap is enlarged again, and thereby the pressure of oil passing through the gap is increased again. Accordingly, the pressure applied to the frustoconical head is increased again so that the exhaust control valve is moved backward while compressing the spring.

The forward and backward movement of the exhaust control valve is repeated quickly until the operation of the electromagnetic pump has finished, so as to maintain the pressure of exhausted oil constant.

Meanwhile, when the operation of the electromagnetic pump has finished, the spring having relatively strong biasing force pushes the exhaust control valve forward so that the nipple of the exhaust control valve is quickly moved to the initial position so as to block off the oil exhaust path. Thus, oil of low pressure does not leak to the burner after the operation of the electromagnetic pump has finished. Accordingly, an incomplete combustion of oil, which is caused by a leakage of oil of low pressure to the burner, can be prevented and the bad smell does not generate.

BRIEF DESCRIPTION OF THE DRAWINGS

The above object and other advantages of the present invention will become more apparent by describing in detail preferred embodiments thereof with reference to the attached drawings, in which.

DESCRIPTION OF THE PREFERRED EMBODIMENTS

Figure 1:
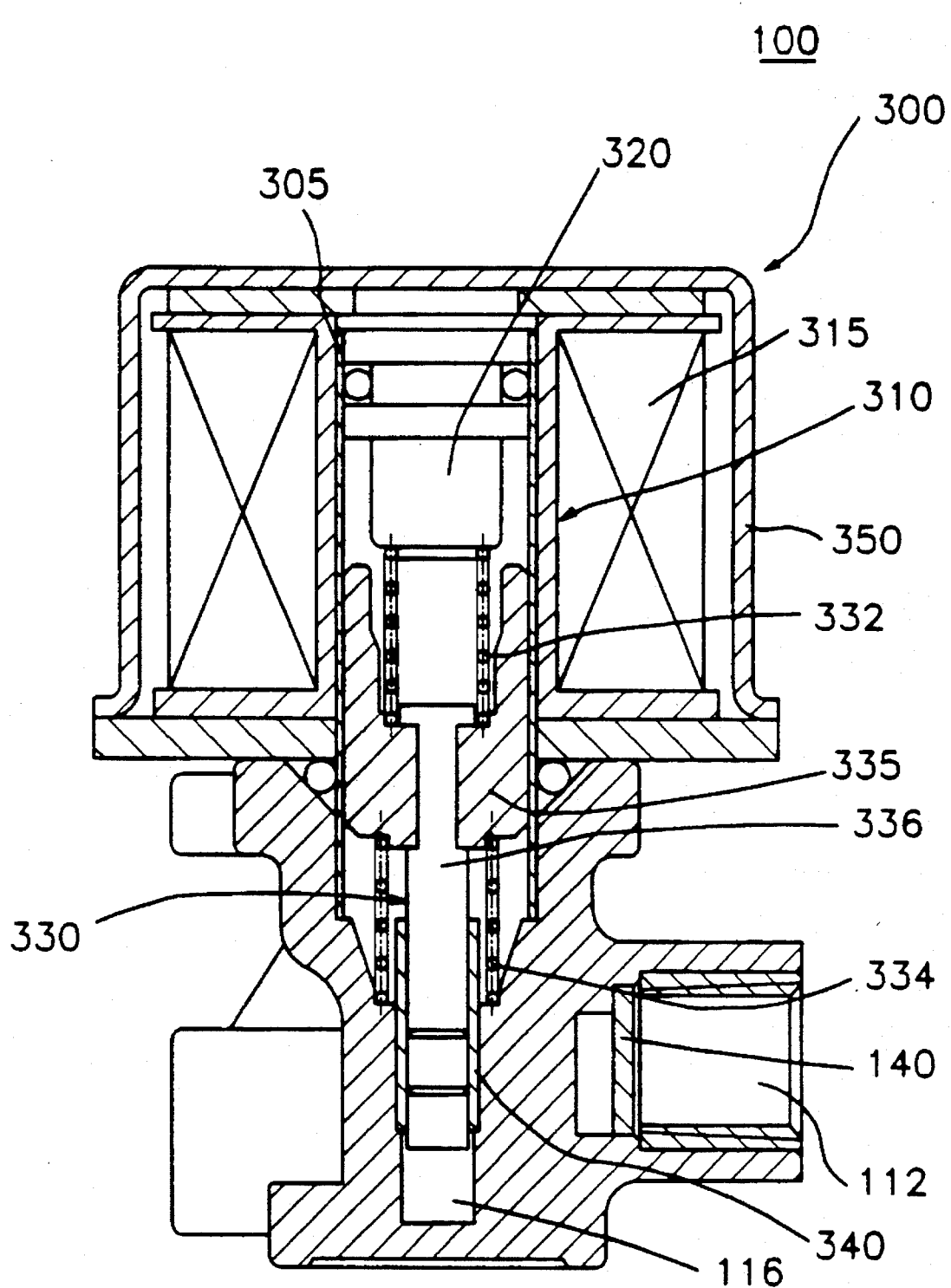
FIG. 1 is a side sectional view of an electromagnetic pump having an exhaust control valve according to one embodiment of the present invention.

Hereinafter, the present invention will be described in detail with reference to the accompanying drawings. In the drawings, the similar elements have the similar reference numerals.

Figure 2:
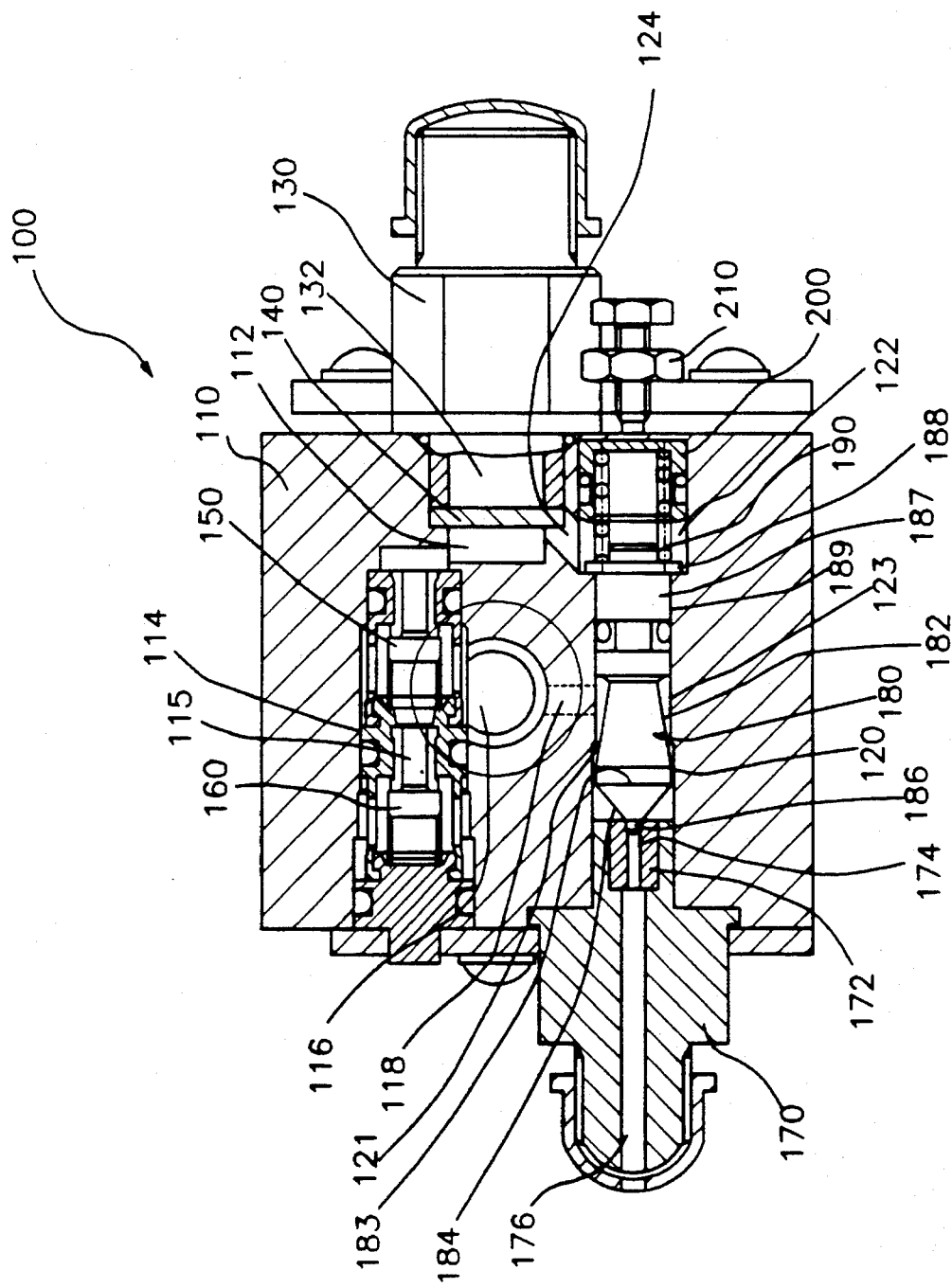
FIG. 2 is a plan sectional view of the electromagnetic pump as shown in FIG. 1.

FIG. 1 is a side sectional view of an electromagnetic pump having an exhaust control valve according to one embodiment of the present invention, and FIG. 2 is a plan sectional view of the electromagnetic pump as shown in FIG. 1.

As shown in FIGS. 1 and 2, an electromagnetic pump 100 has a pump body 110. Pump body 110 comprises an inlet portion 112 for receiving oil from an oil tank, a valve chamber 114 interconnected with inlet portion 112, a working chamber 116 interconnected with valve chamber 114 in such a manner that a plunger assembly 330 can move up and down in working chamber 116, an exhaust chamber 120 interconnected with working chamber 116 through a second oil path 118 and a back pressure chamber 122 interconnected with inlet portion 112 through a back pressure oil path 524. Exhaust chamber 120 has a neck portion 123 having a smaller diameter than that of exhaust chamber 120.

A connecting pipe 130 connected to the oil tank through a suction nozzle (not shown) for receiving oil is inserted in inlet portion 112 of pump body 110 and a filter 140 for filtering impurities is attached to an end of connecting pipe 130.

In addition, a suction check valve 150 and an exhaust check valve 160 are arranged in valve chamber 114 of pump body 110 in such a manner that they permit oil to flow in the same direction. Working chamber 116 is interconnected with a first oil path 115 formed between suction check valve 150 and exhaust check valve 160 so that suction check valve 150 and exhaust check valve 160 are alternately opened and closed as plunger assembly 330 is moved up and down in working chamber 116.

In exhaust chamber 120 of pump body 110, which is interconnected with working chamber 116 through second oil path 118, an exhaust control valve 180 according to the present invention and an exhaust nozzle 170 for exhausting oil are installed. Exhaust nozzle 170 has a second exhaust path 176, and a seat 172 having a first exhaust path 174 interconnected with exhaust chamber 120 is inserted in an end of exhaust nozzle 170.

Figure 3:
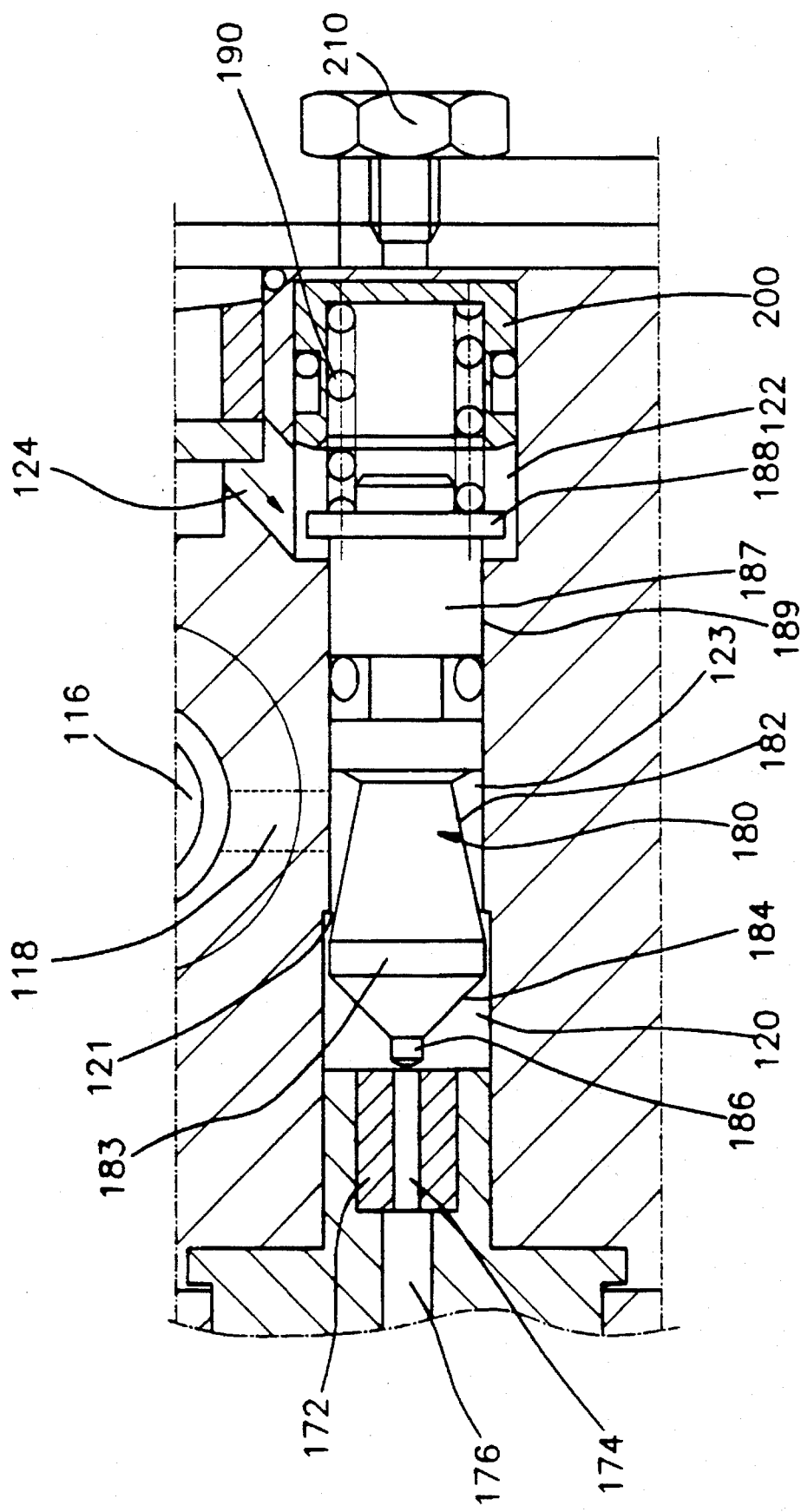
FIG. 3 is an enlarged view of the exhaust control valve as shown in FIG. 2 when it is moved to a completely opened position.

As shown in FIGS. 2 and 3, exhaust control valve 180 comprises a cylindrical valve body 182, a frustoconical head 184 formed integrally with one end of cylindrical valve body 182, a nipple 186 having a predetermined length and formed integrally with frustoconical head 184, and a third spring 190 for applying forward biasing force to cylindrical valve body 182.

Cylindrical valve body 182 is tapered backwards so that a gap 121 for introducing the pressurized oil into the front of exhaust chamber 120 is formed between neck portion 123 and cylindrical body 182.

A threshold 183 having the largest diameter in exhaust control valve 180 is formed between cylindrical valve body 182 and frustoconical head 184, and a guide tail 187 closely disposed in a guide hole 189 for guiding the movement of exhaust control valve 180 is incorporated with the other end of cylindrical valve body 182. Back pressure chamber 122 is isolated from exhaust chamber 120 by guide tail 187. At an end of guide tail 187, a flange 188 which is supported by third spring 190 is formed.

On the other hand, frustoconical head 184 is tapered forwards and a taper angle of frustoconical head 184 is larger than that of cylindrical valve body 182. These taper angles relate to the forward and backward movement of exhaust control valve 180 so that they should be selected properly.

Nipple 186 having a predetermined length is also tapered forwards and a taper angle of nipple 186 is smaller than that of frustoconical head 184. Nipple 186 is inserted in first exhaust path 174 of seat 172 at its initial position. Since nipple 186 is slightly tapered, a thin passage is formed between tapered nipple 186 and first exhaust path 174 when nipple 186 moves backwards from the initial position so that pressure of the exhaust oil can be decreased while passing through the thin passage.

Third spring 190 is disposed in back pressure chamber 122 of pump body 110 and is surrounded by a spring cap 200. Spring cap 200 keeps third spring 190 in its regular position and an adjuster 210 for adjusting initial biasing force of third spring 190 is connected to spring cap 200. According to another embodiment of the present invention, third spring 190 for supporting exhaust control valve 180 may have two springs. In this case, the lengths and biasing forces of the two springs are different from each other, and one of the two springs is accommodated in the other. When third spring 190 is composed of two springs, initial and second biasing forces of third spring 190 can be easily set.

Meanwhile, an actuating section 300 for actuating electromagnetic pump 100 is provided on an upper surface of pump body 110. As shown in FIG. 1, actuating section 300 includes a first hollow cylinder 305, a bobbin 310 surrounding first hollow cylinder 305 and a solenoid 315 wound on an outer surface of bobbin 310 for converting electric force to magnetic force.

Actuating section 300 further has a magnetic core 320 secured in an upper portion of first hollow cylinder 305 for absorbing magnetic force from solenoid 315, plunger assembly 330 movably disposed below magnetic core 320, and a second cylinder 340 inserted in working chamber 116 of pump body 110.

Plunger assembly 330 includes a plunger 335 and a piston 336 which is formed integrally with plunger 335 and extended downwards from plunger 335. Second cylinder 340 has a smaller diameter than that of first cylinder 305. One end of piston 336 is inserted in second cylinder 340 so as to move up and down therein. A first spring 332 is disposed between magnetic core 320 and plunger 335, and a second spring 334 is disposed under plunger 335 in order to keep plunger 335 in the range of magnetic force.

Hereinafter, the operation of electromagnetic pump 100 having exhaust control valve 180 according to the present invention will be described.

First, when the electric power is applied to solenoid 315, magnetic core 320 is magnetized so that plunger assembly 330 moves upwards. As plunger assembly 330 moves upwards, piston 336 inserted in second cylinder 340 is also moved upwards so that the volume of working chamber 116 is expanded, and thereby the pressure in first oil path 115 connected to working chamber 116 decreases. Thus, suction check valve 150 is opened and exhaust check valve 160 is closed, while the oil is supplied to inlet portion 112 of pump body 110 from the oil tank through suction path 132 of connecting pipe 130. Some of the supplied oil fills up back pressure chamber 122 through back pressure oil path 124, and the remaining oil is purged through filter 540 and then passes through suction check valve 150 disposed in valve chamber 114.

Figure 5:
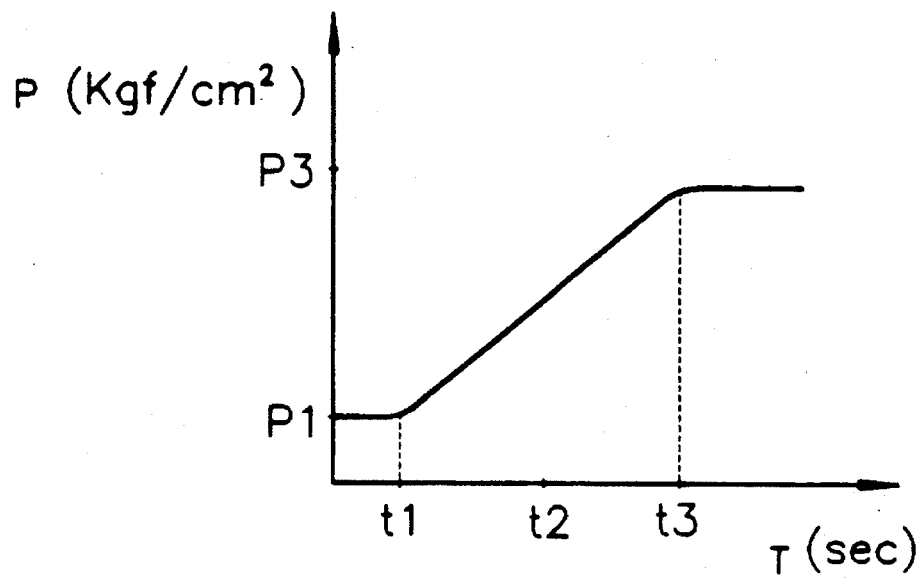
FIG. 5 is a graph for showing increase of pressure of exhausted oil as a function of time when the electromagnetic pump having the exhaust control valve as shown in FIG. 2 has been operating.
Figure 7:
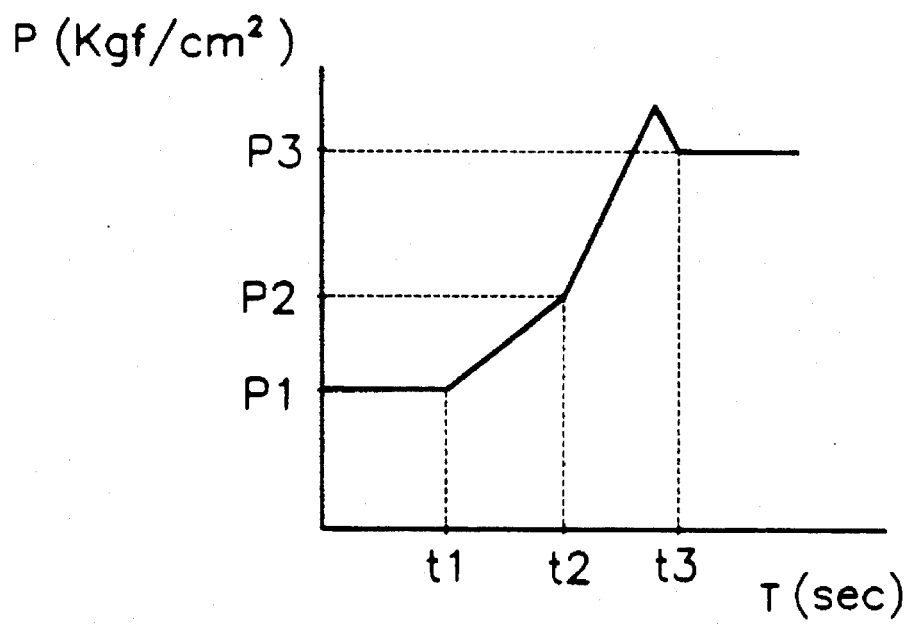
FIG. 7 is a graph for showing increase of pressure of exhausted oil as a function of time when the conventional electromagnetic pump as shown in FIG. 6 has been operating.
Figure 6:
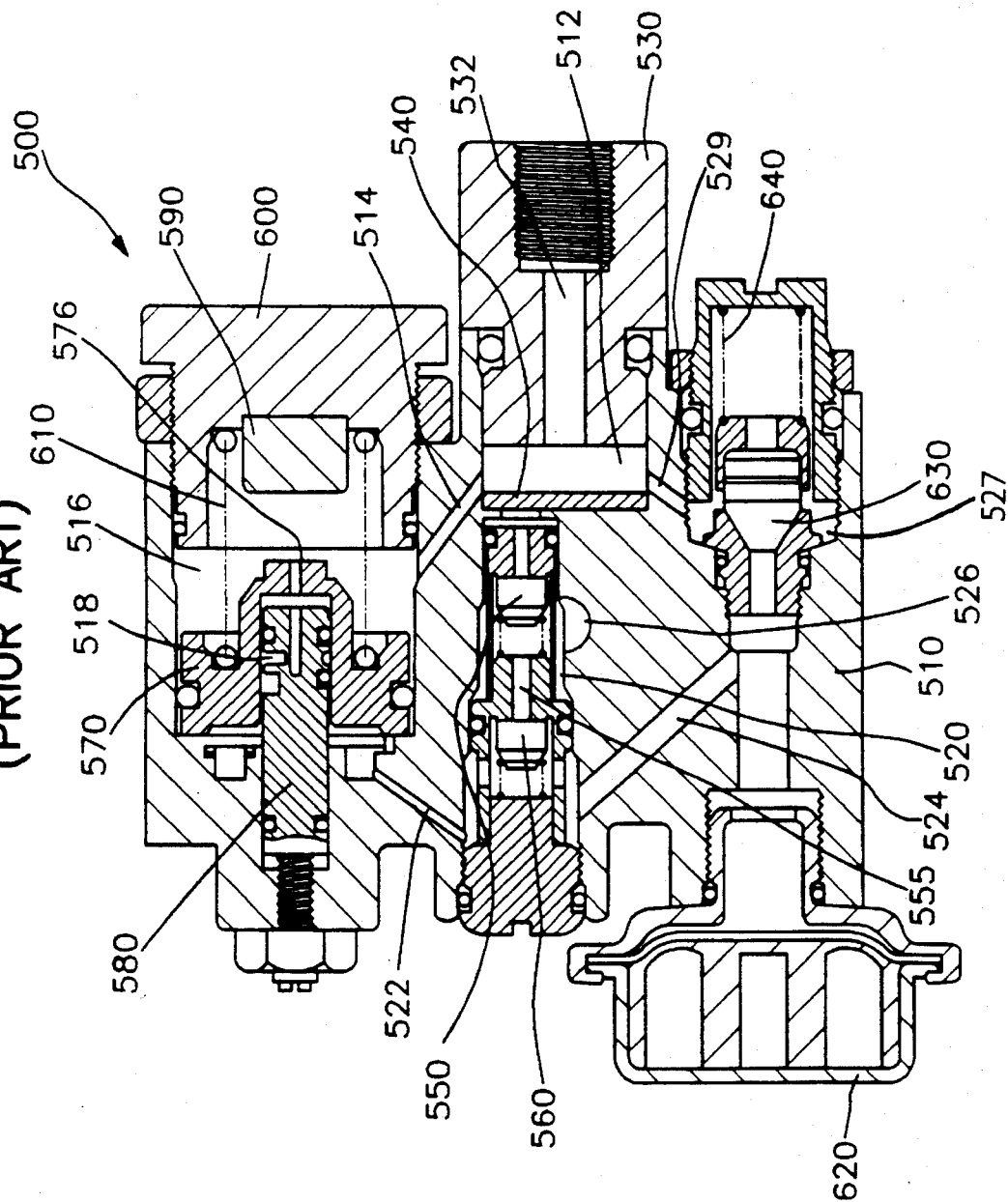
FIG. 6 is a plan sectional view of a conventional electromagnetic pump.
Figure 8:
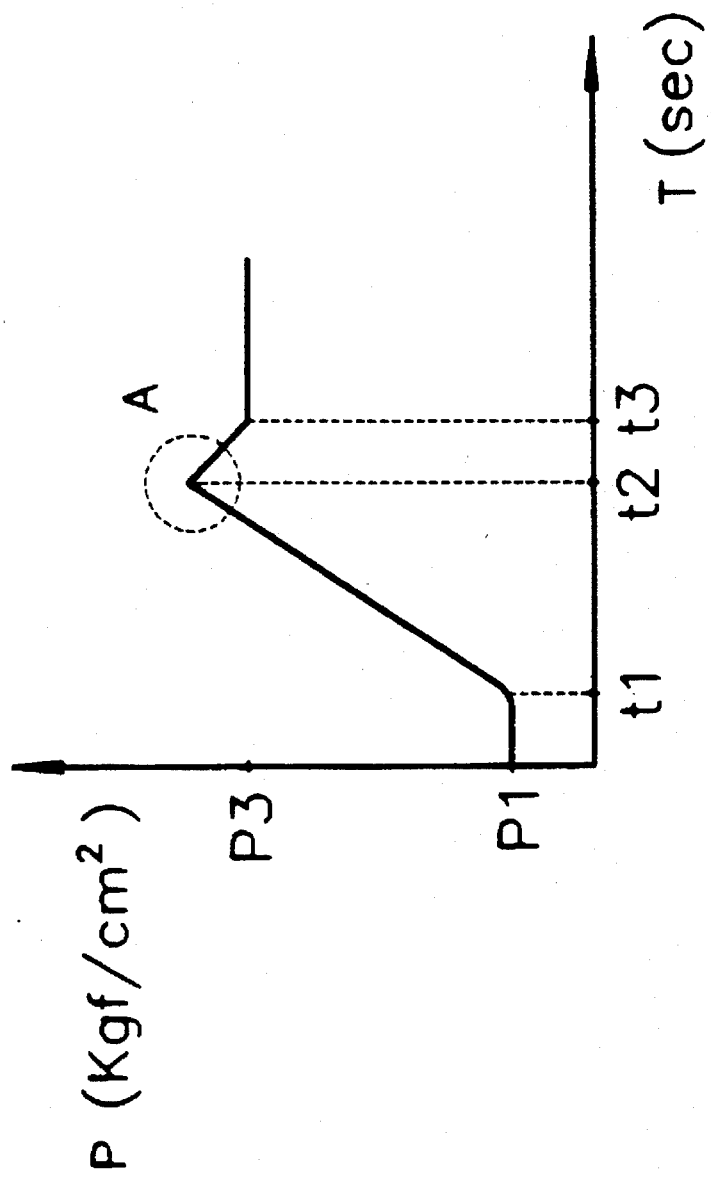
FIG. 8 is a graph showing increase of pressure of exhausted oil as a function of time when another conventional electromagnetic pump has been operating.

Meanwhile, when the electric power applied to solenoid 315 is cut-off, the magnetic force applied to magnetic core 320 is released so that plunger assembly 330 moves downwards by means of the biasing force of first spring 332. As plunger assembly 330 moves downwards, piston 336 inserted in second cylinder 340 also moves downwards so that the volume of working chamber 116 is compressed, and thereby the pressure in first oil path 115 connected to working chamber 116 is increased. Accordingly, suction check valve 150 is closed and exhaust check valve 160 is opened, while the oil pressurized in working chamber 116 passes through exhaust check valve 150. At the same time, as shown in FIG. 5, the pressure of oil is increased from initial pressure P1. The pressurized oil having passed through exhaust check valve 160 fills up exhaust chamber 120 through second oil path 118.

The above described process is repeated whenever electric power is intermittently applied to solenoid 310, and thereby the pressure of oil in exhaust chamber 120 increases according to such a repetition. When the pressure of oil having been increased in exhaust chamber 120 overcomes initial biasing force of third spring 190, exhaust control valve 180 is pushed backwards from the initial position while compressing third spring 190. At this time, the oil filled in back pressure chamber 122 damps the movement of exhaust control valve 180.

However, since nipple 186 of exhaust control valve 180 has a predetermined length, first exhaust path 174 which is blocked by nipple 186 at its initial position, is not completely opened simultaneously with the movement of exhaust control valve 180. That is, nipple 186 gradually moves backwards from the initial position while forming the thin passage between tapered nipple 186 and first exhaust path 174, and accordingly only a little quantity of oil is exhausted to the burner through the thin passage until nipple 186 is moved to the completely opened position as shown in FIG. 3. At this time, the pressure of the exhausted oil is maintained below the normal exhaust pressure P3, and thereby the exhausted oil can be easily burned by the burner when the burner is ignited, without generating the loud noise. This is a special function of nipple 186 according to the present invention. That is, by means of nipple 186 having a predetermined length and a slightly tapered body, the exhaust time of oil having normal exhaust pressure P3 can be delayed so that the loud noise, which is caused by exhaust of high pressurized oil to the burner when the burner is ignited, can be prevented.

Meanwhile, as the pressure of oil in exhaust chamber 120 increases continuously by the repetition of the up and down movement of plunger assembly 330, nipple 186 farther moves backwards so that the pressure of oil exhausted to the burner increases. With the backward movement of nipple 186, the sectional area of gap 121 formed between neck portion 123 and tapered valve body 182 becomes narrower. The sectional area of gap 121 relates to the pressure applied to frustoconical head 184. That is, the smaller the sectional area of gap 121 is, the more the pressure of oil passing therethrough drops. Thus, when the sectional area of gap 121 becomes smaller, the pressure applied to frustoconical head 184 is decreased. Accordingly, when nipple 186 is moved to the predetermined position in exhaust chamber 120, the pressure applied to frustoconical head 184 is balanced with biasing force of third spring 190 supporting the rear end of exhaust control valve 180. At this time, third spring 190 has second biasing force which is stronger than its initial biasing force.

From this state, when the pressure applied to frustoconical head 184 yields to the second biasing force of third spring 190, exhaust control valve 180 moves forwards while increasing the sectional area of gap 121, and when the pressure applied to frustoconical head 184 is increased again, exhaust control valve 180 moves backwards while compressing third spring 190 again, and thereby the pressure of the exhausted oil can be maintained constant. As shown in FIG. 5, the second biasing force of third spring 190 is equivalent to normal exhaust pressure P3 of oil, and can be indirectly adjusted by adjusting the initial biasing force of third spring 190 by using adjuster 210.

The forwards and backwards movement of exhaust control valve 180 is repeated in a short cycle until the operation of electromagnetic pump 100 has been finished, so as to maintain the pressure of the exhausted oil constant. Meanwhile, the stroke of the forwards and backwards movement of exhaust control valve 180 is very short, and accordingly the oil having almost normal exhaust pressure P3 can be exhausted to the burner during the forwards and backwards movement of exhaust control valve 180.

As described above, the forwards and backwards movement of exhaust control valve 180 is controlled by an interaction between the pressure applied to frustoconical head 184 and the biasing force of third spring 190, and since the movement is performed in a short cycle, the pulsation of the pressurized oil decreases. In other words, exhaust control valve 180 sensitively responds to the pressure of the pressurized oil and does not completely block off first oil exhaust path 174 when the oil is being exhausted through first oil exhaust path 174, and accordingly the exhaust of oil through first oil exhaust path 174 is not intermittent so that the pulse or fluctuation of the pressure of the exhausted oil is greatly reduced, and thereby a separate element such as buffer 620 in a conventional electromagnetic pump for damping the pulse is unnecessary.

Meanwhile, when the operation of electromagnetic pump 500 has been finished, the electric power applied to solenoid 315 is completely cut off so that the up and down movement of plunger assembly 335 is stopped. Thus, the supply of the pressurized oil through second oil path 118 to exhaust chamber 120 is stopped, and thereby the pressure of oil in exhaust chamber 120 decreases. Accordingly, exhaust control valve 180 moves toward first oil exhaust path 174 by the biasing force of third spring 190.

Figure 4:
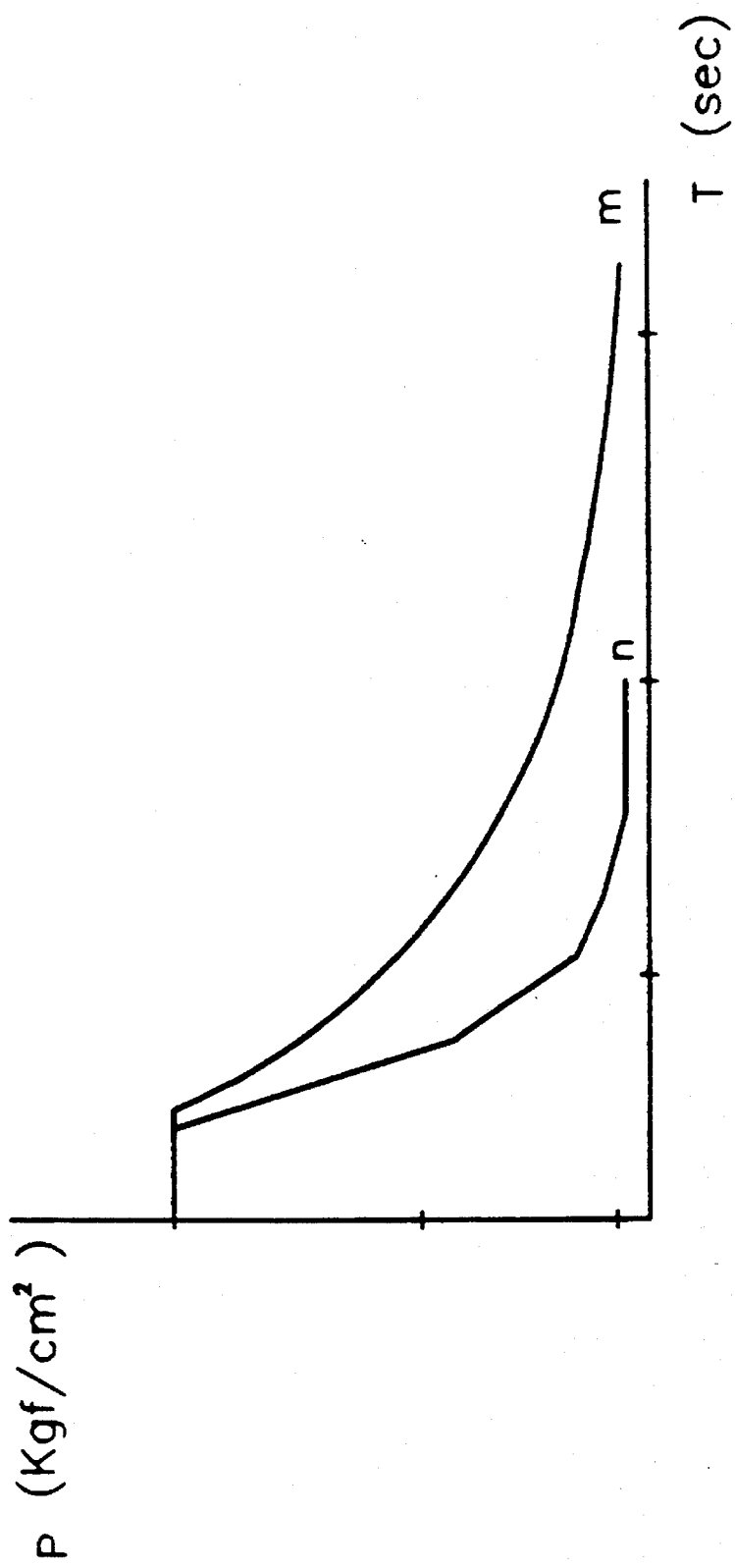
FIG. 4 is a graph for showing decrease of oil pressure as a function of time after the operations of the electromagnetic pumps have finished.

FIG. 4 is a graph for showing the decrease of oil pressure as a function of time after the operations of the electromagnetic pumps have finished. As shown in FIG. 4, a slope of a curved line (n), which represents the decrease of the oil pressure in electromagnetic pump 100 having exhaust control valve 180 according to the present invention, is steeper than that of a curved line (m) which represents decrease of oil pressure in a conventional electromagnetic pump. It can be noted that the speed of pressure reduction in electromagnetic pump 100 having an exhaust control valve 180 according to the present invention is faster than that of the conventional electromagnetic pump after the operations of the electromagnetic pumps have finished. It is due to the reason that, when the operation of electromagnetic pump 100 having exhaust control valve 180 according to the present invention has finished, third spring 190 having a relatively strong biasing force pushes exhaust control valve 180 forwards so that nipple 186 of exhaust control valve 180 moves quickly to the initial position so as to block off first oil exhaust path 174.

Simultaneously with the movement of nipple 186 of exhaust control valve 180 to the initial position, the pressurized oil in exhaust chamber 120 having a pressure overcoming the initial biasing force of third spring 190 is exhausted to the burner and easily burned by the burner, on the other hand, the pressurized oil in exhaust chamber 120 having pressure yielded to the initial biasing force of third spring 190 remains in electromagnetic pump 100. Accordingly, an incomplete combustion of oil, which is caused by a leakage of oil of low pressure to the burner, can be prevented and the bad smell is not produced.

As described above, by means of exhaust control valve 180 for electromagnetic pump 100, the pressure and quantity of exhausted oil can be maintained constant, and a loud noise caused by the exhaust of the high pressurized oil can be prevented.

In addition, after the operation of electromagnetic pump has finished, the oil of low pressure does not leak to the burner and the oil of high pressure is completely burned by the burner so that the bad smell caused by an incomplete combustion of the exhausted oil can be prevented.

Furthermore, by means of the exhaust control valve for an electromagnetic pump according to the present invention, additional parts such as a pressure control plunger and a relief valve for controlling the oil pressure, and a buffer for damping the oil pulsation which are used in the conventional electromagnetic pump, are unnecessary in an electromagnetic pump so that the construction of electromagnetic pump can be simplified, manufacturing cost can be reduced, and the volume of body of electromagnetic pump can be minimized.

Moreover, since the quantity and pressure of exhaust oil can be controlled automatically by an exhaust control valve, energy efficiency is improved.

While the present invention has been particularly shown and described with reference to the preferred embodiments thereof, it will be understood by those skilled in the art that various changes in form and details may be effected therein without departing from the spirit and scope of the invention as defined by the appended claims.

What is claimed is:

1. An exhaust control valve for an electromagnetic pump, the exhaust control valve comprising:

a valve body having a cylindrical shape which is tapered toward a rear end thereof, and is disposed in an exhaust chamber so as to move forwards and backwards in the exhaust chamber, the exhaust chamber being defined in the electromagnetic pump for receiving a pressurized oil and then exhausting the pressurized oil through a first oil exhaust path, the exhaust chamber having a gap defined between the valve body and an inner wall of the exhaust chamber so that the pressurized oil passes through the gap;

a first means for sensing a pressure of the pressurized oil and for transferring the pressure to the valve body, wherein the first means is a frustoconical head which is tapered towards a front end thereof and is formed integrally with one end of the valve body;

a second means for opening and closing the first oil exhaust path interconnected to the exhaust chamber, and for reducing the pressure of the pressurized oil passing through the first oil exhaust path as the first oil exhaust path is opened, the second means delaying an exhaust of a pressurized oil having a normal exhaust pressure and formed integrally with the first means;

a third means for applying a forward biasing force to the valve body, wherein the third means includes a spring disposed in a back pressure chamber, the back pressure chamber being formed at the rear of the exhaust chamber, and the back pressure chamber and the exhaust chamber being isolated from each other; and a threshold disposed between the cylindrical valve body and the frustoconical head, the threshold having a diameter larger than a remaining portion of the exhaust control valve, wherein the valve body moves forwards and backwards according to interaction between the pressure sensed by the first means and the forward biasing force by the third means, the gap has a sectional area varying according to the forwards and backwards movement of the valve body, so that a pressure of an oil exhausted from the exhaust chamber is controlled according to the movement, wherein the exhaust chamber has a neck portion surrounding the rear end of the valve body, the neck portion has a smaller diameter with respect to a remaining portion of the exhaust chamber so that the sectional area of the gap formed between the neck portion and the tapered valve body is varied according to the forward and backward movement of the tapered valve body.

2. The exhaust control valve for the electromagnetic pump as claimed in claim 1, wherein a taper angle of the frustoconical head is larger than a taper angle of the cylindrical valve body.

3. The exhaust control valve for the electromagnetic pump as claimed in claim 1, wherein the threshold has an annular hoop shape.

4. The exhaust control valve for the electromagnetic pump as claimed in claim 1, wherein the second means includes a nipple for opening and closing the first oil exhaust delaying path, the nipple formed integrally with the front end of the frustoconical head.

5. The exhaust control valve for the electromagnetic pump as claimed in claim 1, wherein the nipple has a predetermined length and is tapered towards a front end thereof.

6. The exhaust control valve for the electromagnetic pump as claimed in claim 1, wherein the nipple is inserted in the first oil exhaust path at its initial position and has a taper angle smaller than that of the frustoconical head so that the sectional area of the first oil exhaust path is increased as the nipple moves from the initial position, and when the nipple is completely drawn from the first oil exhaust path, the sectional area of the oil exhaust path is maintained constant.

7. The exhaust control valve for the electromagnetic pump as claimed in claim 1, the exhaust control valve further comprising an adjuster for adjusting biasing force of the spring.

8. The exhaust control valve for the electromagnetic pump as claimed in claim 1, wherein the back pressure chamber is interconnected with an oil inlet portion of the electromagnetic pump through a back pressure oil path.

9. The exhaust control valve for the electromagnetic pump as claimed in claim 1, the exhaust control valve further comprising a fourth means for guiding the forward and backward movement of the exhaust control valve.

10. The electromagnetic pump as claimed in claim 1, wherein the fourth means includes a guide tail formed integrally with other end of the cylindrical valve body, the guide tail being closely disposed in a guide hole formed between the exhaust chamber and the back pressure chamber so that the exhaust chamber and the back pressure chamber are sealed from each other by the guide tail.

11. The exhaust control valve for the electromagnetic pump as claimed in claim 1, the exhaust control valve further comprising a flange provided at a rear end of the guide tail, the flange being supported by the spring.

12. An exhaust control valve for an electromagnetic pump, the exhaust control valve comprising:

a cylindrical valve body disposed in an exhaust chamber so as to move forwards and backwards therein, the cylindrical valve body being tapered toward a rear end thereof, the exhaust chamber being defined in the electromagnetic pump for receiving a pressurized oil and then exhausting the pressurized oil through a first oil exhaust path, the exhaust chamber having a gap defined between the valve body and an inner wall of the exhaust chamber in order for the pressurized oil to pass therethrough;

a frustoconical head formed integrally with one end of the valve body, the frustoconical head being tapered toward a front end of the frustoconical head and having a taper angle larger than that of the valve body, the frustoconical head sensing a pressure of the pressurized oil and transferring the pressure to the valve body;

a threshold disposed between the cylindrical valve body and the frustoconical head, the threshold being shaped as an annular hoop and having a diameter larger than a remaining portion of the exhaust control valve;

a nipple formed integrally with the front end of the frustoconical head and tapered toward a front end of the nipple, the nipple having a predetermined length and a taper angle smaller than that of the frustoconical head, the nipple opening and closing the first oil exhaust path interconnected to the exhaust chamber, the nipple being inserted in the first oil exhaust path at its initial position so that the sectional area of the first oil exhaust path is increased as the nipple is moved from the initial position, and when the nipple being completely drawn from the first oil exhaust path, the sectional area of the first oil exhaust path being maintained constant, the nipple reducing pressure of the oil passing through the first oil exhaust path as the first oil exhaust path is opened and delaying an exhaust of a pressurized oil having a normal exhaust pressure;

a spring disposed in a back pressure chamber for applying forward biasing force to the cylindrical valve body, the back pressure chamber being formed in the rear of the exhaust chamber and interconnected to an inlet portion of the electromagnetic pump through a back pressure oil path, the back pressure chamber and the exhaust chamber being isolated from each other;

an adjuster for adjusting the biasing force of the spring;

a guide tail formed integrally with other end of the cylindrical valve body and closely disposed in a guide hole formed between the exhaust chamber and the back pressure chamber for guiding the forward and backward movement of the exhaust control valve, the guide tail isolating the exhaust chamber from the back pressure chamber; and a flange provided at a rear end of the guide tail, the flange being supported by the spring, wherein the valve body is moved forwards and backwards according to interaction between the pressure sensed by the frustoconical head and the forward biasing force by the spring, the exhaust chamber has a neck portion surrounding the rear end of the valve body, the neck portion has a smaller diameter with respect to the rest of the exhaust chamber so that the sectional area of the gap formed between the neck portion and the tapered valve body is varied according to the forward and backward movement of the tapered valve body, and thereby pressure of the oil exhausted from the exhaust chamber is controlled.

* * * * *